United States Patent
Nakata et al.

(10) Patent No.: US 9,541,406 B2
(45) Date of Patent: Jan. 10, 2017

(54) APPARATUS USING RADIO RECEPTION FOR DETECTING DISPLACEMENT OF A VEHICLE IN A DIRECTION AT RIGHT ANGLES TO ITS ADVANCEMENT DIRECTION

(71) Applicant: DENSO CORPORATION, Kariya, Aichi-pref. (JP)

(72) Inventors: Tsuneo Nakata, Kariya (JP); Toru Nagura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/878,231

(22) Filed: Oct. 8, 2015

(65) Prior Publication Data

US 2016/0102985 A1  Apr. 14, 2016

(30) Foreign Application Priority Data

Oct. 10, 2014  (JP) ................. 2014-208940

(51) Int. Cl.
*G01C 21/28* (2006.01)
*H04W 4/04* (2009.01)
*G01C 21/36* (2006.01)
*G01C 21/34* (2006.01)
*G01S 5/02* (2010.01)

(52) U.S. Cl.
CPC ............. *G01C 21/28* (2013.01); *G01C 21/34* (2013.01); *G01C 21/3658* (2013.01); *G01S 5/02* (2013.01); *H04W 4/046* (2013.01)

(58) Field of Classification Search
CPC ..... G06F 17/00; G01C 21/28; G01C 21/3658; G01C 21/34

USPC ........ 701/300, 409, 410, 411, 454, 515, 521
See application file for complete search history.

(56) References Cited

U.S. PATENT DOCUMENTS

| | | | |
|---|---|---|---|
| 5,913,918 A * | 6/1999 | Nakano | G01C 21/36 340/995.14 |
| 6,226,591 B1 * | 5/2001 | Okumura | G01C 21/28 701/409 |
| 6,876,845 B1 * | 4/2005 | Tabata | H04B 1/3822 455/11.1 |
| 2004/0249568 A1 * | 12/2004 | Endo | G01C 21/3492 701/410 |

(Continued)

FOREIGN PATENT DOCUMENTS

JP  2013-257306 A  12/2013

*Primary Examiner* — Thomas G Black
*Assistant Examiner* — Wae Louie
(74) *Attorney, Agent, or Firm* — Knobbe, Martens, Olson & Bear, LLP

(57) ABSTRACT

An apparatus installed on a host vehicle derives travel locus/condition information relating each of a plurality of reception positions on the vehicle to a corresponding reception condition (e.g., received signal strength), and updates the information at each of successive positions along a travel locus of the vehicle. The currently obtained information is compared with reference travel locus/condition information previously obtained by travel along a reference travel locus, in the same travel direction, by the host vehicle or similar vehicle. Degrees of similarity between the currently obtained information and the reference information are evaluated, and the results used to detect changes in position of the host vehicle along a direction at right angles to its advancement direction.

8 Claims, 13 Drawing Sheets

(56) References Cited

U.S. PATENT DOCUMENTS

| | | | | |
|---|---|---|---|---|
| 2007/0244636 A1* | 10/2007 | Horikami | ............... | G01C 21/32 |
| | | | | 701/532 |
| 2010/0114975 A1* | 5/2010 | Kanematsu | ............ | G01C 21/32 |
| | | | | 707/802 |
| 2011/0018763 A1* | 1/2011 | Watanabe | ............... | G01S 19/23 |
| | | | | 342/357.62 |
| 2013/0015984 A1* | 1/2013 | Yamashiro | ............... | G08G 1/22 |
| | | | | 340/988 |
| 2013/0204520 A1* | 8/2013 | Nomura | ............ | G01C 21/3658 |
| | | | | 701/411 |
| 2013/0268186 A1* | 10/2013 | Yamashiro | .............. | G06F 17/00 |
| | | | | 701/300 |
| 2013/0310067 A1 | 11/2013 | Nakata et al. | | |
| 2014/0129137 A1* | 5/2014 | Yamashiro | ......... | G01C 21/3407 |
| | | | | 701/515 |
| 2016/0102985 A1* | 4/2016 | Nakata | ................... | G01C 21/28 |
| | | | | 701/521 |

\* cited by examiner

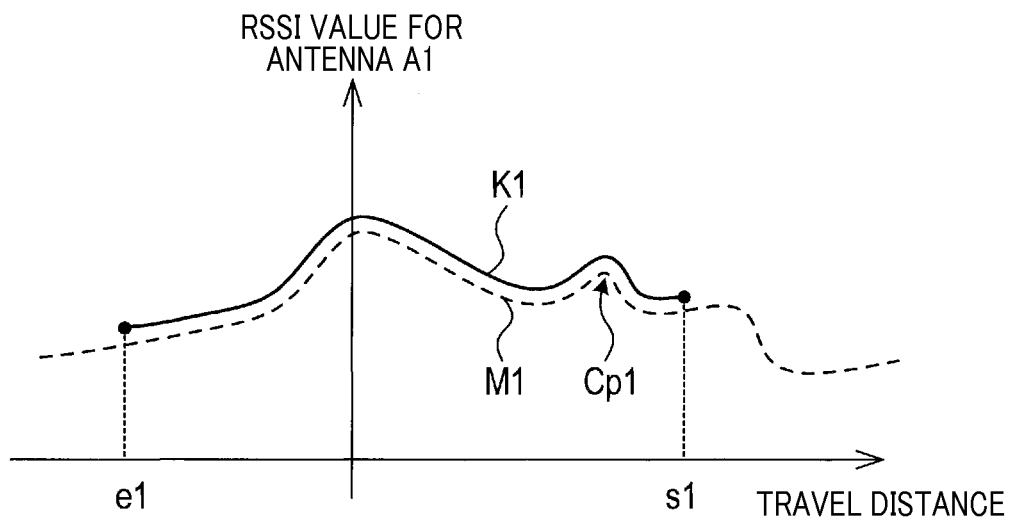
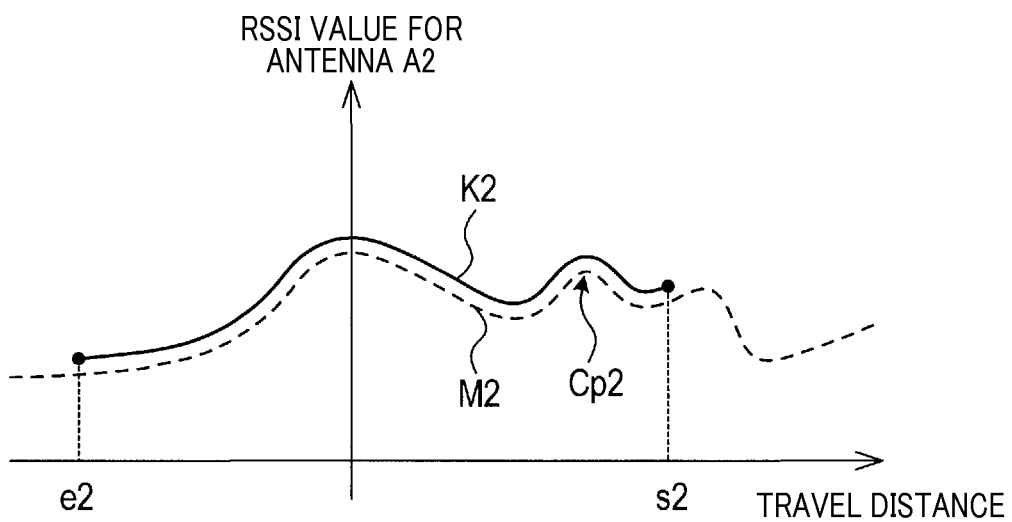

$I(K1, M2) < I(K2, M1)$ $I(K1, M2) \fallingdotseq I(K2, M1)$ $I(K1, M2) > I(K2, M1)$

APPARATUS USING RADIO RECEPTION FOR DETECTING DISPLACEMENT OF A VEHICLE IN A DIRECTION AT RIGHT ANGLES TO ITS ADVANCEMENT DIRECTION

CROSS-REFERENCE TO RELATED APPLICATIONS

This application is based on and incorporates herein by reference Japanese Patent First Application No. 2014-208940 filed on Oct. 10, 2014.

BACKGROUND OF THE INVENTION

Field of Application

The present invention relates to a vehicle-installed apparatus for use in estimating the position of a vehicle based on variations in a condition of reception of radio waves.

Description of Related Art

Position measurement systems are known for estimating the current position of a vehicle along a travel locus (a path traced out by the vehicle as it moves along a route) by using a relationship between positions along the travel locus and variations in reception condition of radio waves received by an apparatus of the vehicle.

An example of such a position measurement system is described in Japanese patent publication No. 2013-257306, designated in the following as reference document 1. With that system, reference information is derived beforehand which relates successive positions reached by a motor vehicle along its travel locus to corresponding values of RSSI (received signal strength indication) of radio waves received at these positions, transmitted from a base station. Thereafter when a vehicle of the same type advances along a similar travel locus (i.e., along the same road and same travel direction), an apparatus of the vehicle receives the radio waves and generates information relating the RSSI variation to successive increments of distance traveled by the vehicle. That relationship information is compared with the reference information, for use in estimating positions reached by the vehicle along its route.

However with the technology of reference document 1, it is not possible to estimate the position of the vehicle relative to the reference travel locus with respect to a direction at right angles to the reference travel locus, and thereby detect changes in the vehicle position in a direction at right angles to its current advancement direction.

SUMMARY OF THE INVENTION

Hence it is desired to overcome the above problem by providing a terminal apparatus installed on a host vehicle, which can utilize received radio waves to estimate changes in the position of the host vehicle along a direction at right angles to its advancement direction.

To achieve the above objective, such a terminal apparatus includes a radio communication condition acquisition unit, which acquires respective radio communication conditions at a plurality of radio communication positions on the host vehicle. The acquisition may be based upon judging the conditions of signals conveyed by radio waves that are received by respective antennas installed at the radio communication positions.

The terminal apparatus further includes a travel locus/condition information generating unit, which generates a plurality of travel locus/condition information sets respectively corresponding to the radio communication positions on the host vehicle. Each of the travel locus/condition information sets expresses the radio communication condition of the corresponding radio communication position (e.g., as indicated by the strength of a radio signal conveyed by radio waves received at that position on the vehicle), at each of respective positions on a travel locus of the host vehicle. The term "travel direction" of a vehicle, as used herein, signifies one of two possible mutually opposite directions of travel along a route, e.g., an "up" direction for travelling from a first destination to a second destination and a "down" direction for travelling from the second destination to the first destination.

The terminal apparatus further includes a reception map acquisition unit, which acquires a plurality of reception maps respectively corresponding to the radio communication positions on the host vehicle. Each of the reception maps is generated based on travel locus/condition information which was generated previously by the terminal apparatus of the host vehicle or a vehicle of the same type as the host vehicle, when traveling along the same travel direction as the host vehicle, or may be generated using travel locus/condition information which was generated by a plurality of such vehicles.

The terminal apparatus of the present invention is characterized by a relative position estimation function, as follows. A plurality of respectively different information combinations are determined, each being a combination of one of the travel locus/condition information sets generated by the host vehicle and one of the reception maps. Respective magnitudes of agreement degree are calculated for the information combinations, and these magnitudes are compared with one another. A position of the host vehicle relative to the reference travel locus is then estimated based on results of the comparison.

The locations of the plurality of radio communication positions on the host vehicle are made respectively different with respect to a direction at right angles to the advancement direction of the host vehicle (that is, at right angles to the longitudinal axis of the vehicle), e.g., arrayed in line along such a right-angle direction. This enables the position of the host vehicle relative to the reference travel locus to be estimated with respect to a direction at right angles to the reference travel locus, based on the results of the agreement degree magnitude comparison. The reference travel locus (at each position on the locus) can be expected to be oriented substantially parallel to the advancement direction of the host vehicle. Hence, changes in the position of the host vehicle in a direction at right angles to its advancement direction can be estimated based on the results of the agreement degree magnitude comparison.

In addition, a variation with time of the position of the host vehicle along a direction at right angles to its advancement direction can be estimated based on changes over time in the results of the agreement degree magnitude comparison.

BRIEF DESCRIPTION OF THE DRAWINGS

FIG. 7A is a graph showing an example of a travel locus/RSSI information set K1 and a reception map M1, and FIG. 7B is a corresponding graph showing travel locus/RSSI information set K2 and a reception map M2;

DESCRIPTION OF PREFERRED EMBODIMENTS

First Embodiment

Figure 1:
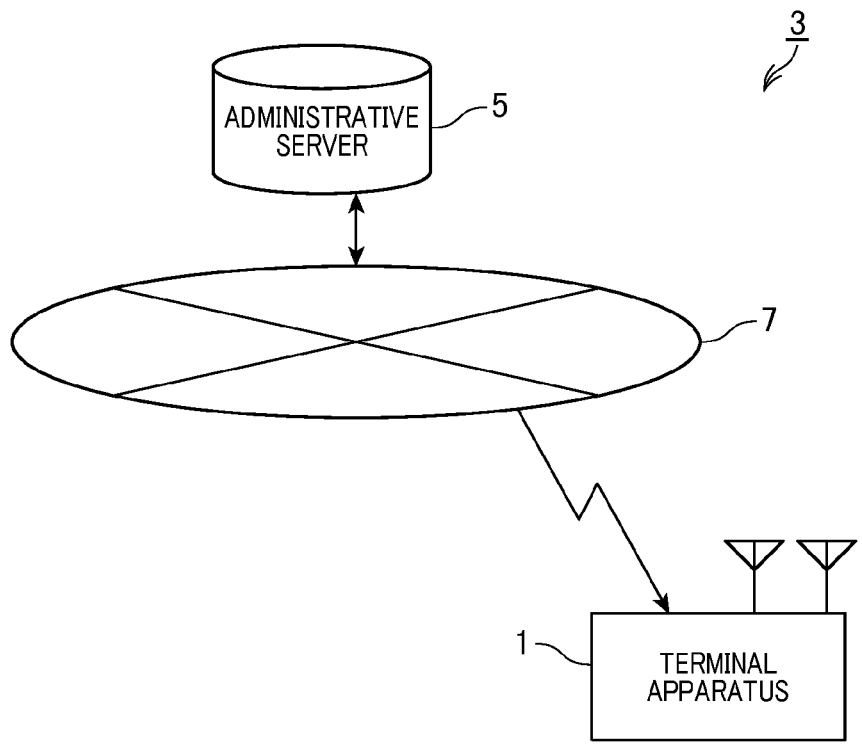
FIG. 1 is a diagram showing the general configuration of a position estimation system.

FIG. 1 is shows the general configuration of a position estimation system 3, which includes an administrative server 5 and a first embodiment of a terminal apparatus, designated by numeral 1. The administrative server 5 and the terminal apparatus 1 communicate via a wireless connection through an Internet circuit 7. The terminal apparatus 1 is installed in a vehicle referred to as the host vehicle 23 in the following.

Figure 2:
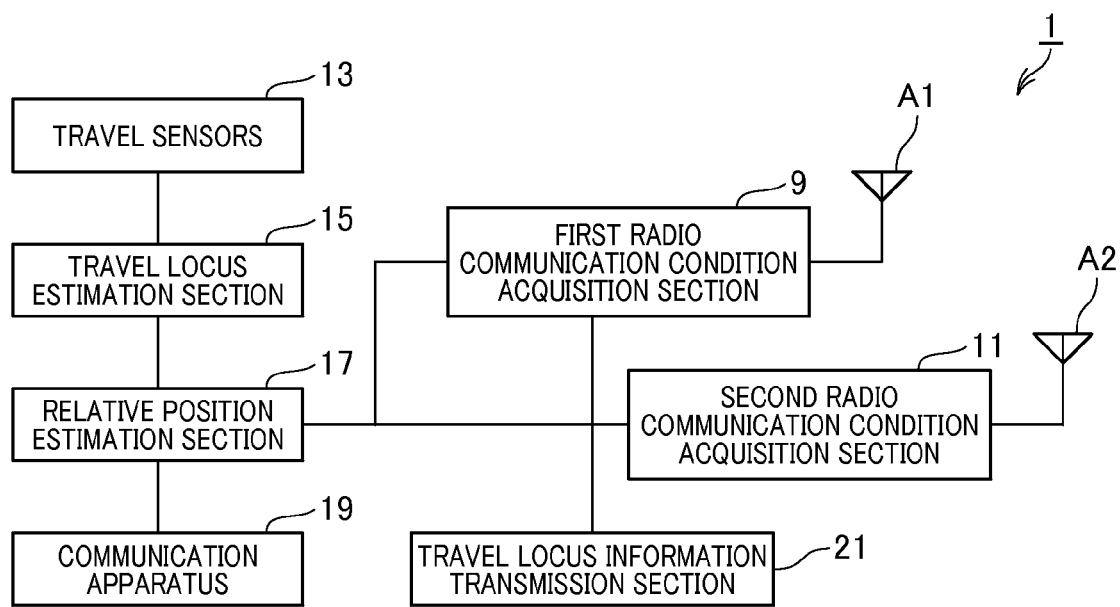
FIG. 2 is a block diagram showing the configuration of an embodiment of a terminal apparatus used in the position estimation system of FIG. 1.

As shown in FIG. 2, the terminal apparatus 1 includes two antennas A1 and A2, a first radio communication condition acquisition section 9, a second radio communication condition acquisition section 11, a travel sensors 13, a travel locus estimation section 15, a relative position estimation section 17, a communication apparatus 19 and a travel locus information transmission section 21.

While the host vehicle 23 is being driven along a route, the first radio communication condition acquisition section 9 detects the radio reception condition of the antenna A1 as indicated by the strength of a signal conveyed by radio waves received by the antenna A1, and the second radio communication condition acquisition section 11 similarly detects the radio reception condition of the antenna A2. Radio waves received by the antennas A1 and A2 may be from a specific broadcasting source, or may be radio waves in the environment of the host vehicle, transmitted from various sources. It is possible to use various received signal conditions to detect a radio reception condition, such as the RSSI (received signal strength indication) value, the direction of change of received signal strength, or (in the case of radio waves modulated to convey a plurality of sub-channels) the phase difference between adjacent sub-channels, or the received signal strength of a single sub-channel, etc. With the described embodiments of the present invention, RSSI values are used for radio reception condition detection.

The travel sensors 13 detects the travel direction of the terminal apparatus 1 (that is, of the host vehicle 23), and values of distance traveled by the host vehicle 23. Generally there are two possible (mutually opposite) travel directions, i.e., an "up" direction and an "down" direction.

The travel locus estimation section 15 applies the results obtained by the travel sensors 13 to obtain an estimated travel locus of the terminal apparatus 1 (the locus of positions successively reached by a center point of the host vehicle 23 as it moves along the travel direction).

The relative position estimation section 17 estimates the position of the terminal apparatus 1 relative to a reference travel locus CM (described hereinafter). The communication apparatus 19 communicates with the administrative server 5 via the Internet, and the travel locus information transmission section 21 uses the communication apparatus 19 to transmit sets of travel locus/RSSI information (described hereinafter) to the administrative server 5.

Figure 3:
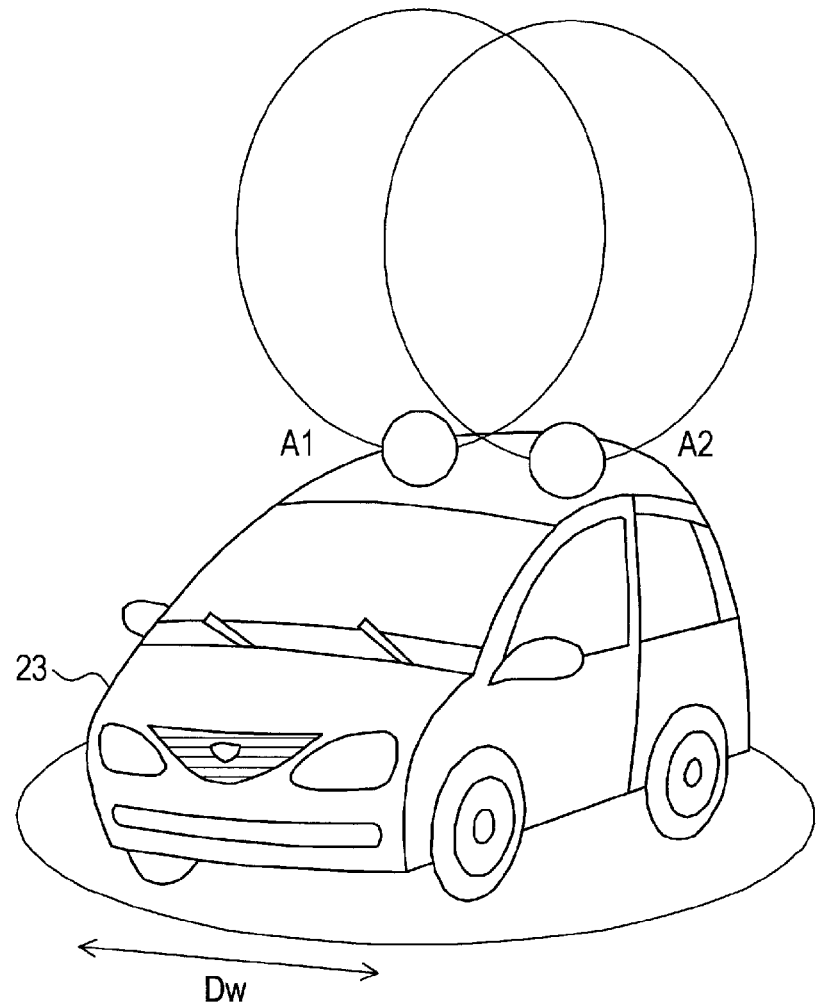
FIG. 3 illustrates the disposition of a pair of antennas which are mounted on a host vehicle of the terminal apparatus.

As shown in FIG. 3 a pair of antennas A1, A2 are mounted on the roof of the host vehicle 23. The positions of the antennas A1, A2 are separated by a distance Dw and are oriented along the width direction of the host vehicle 23 (i.e., at right angles to the longitudinal axis of the vehicle) and hence at right angles to the advancement direction of the host vehicle 23. The positions of the antennas A1 and A2 constitute examples of "radio communication positions" as recited in the appended claims. The relative position estimation section 17 is an example of a travel locus information generating unit, a relative position estimation unit, and a position change estimation unit as recited in the appended claims.

Figure 4:
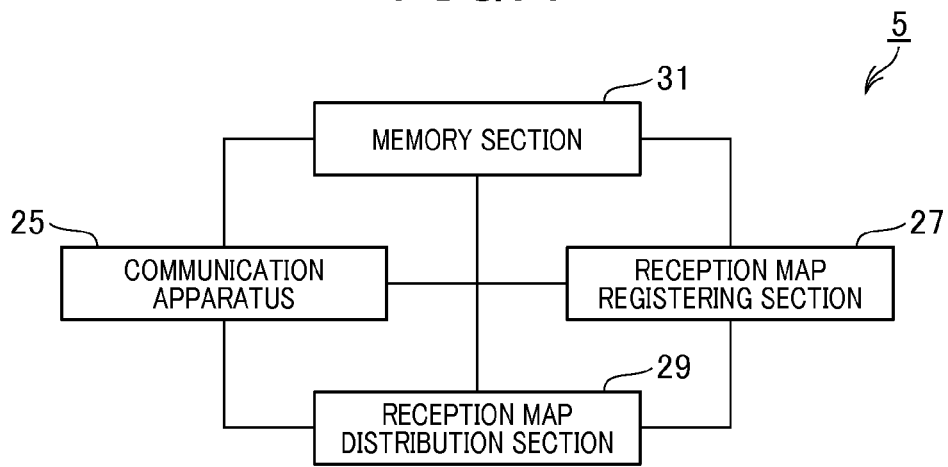
FIG. 4 is a block diagram showing the configuration of an administrative server of the position estimation system.

As shown in FIG. 4, the administrative server 5 includes a communication apparatus 25, a reception map registering section 27 a reception map distribution section 29 and a memory section 31.

The communication apparatus 25 communicates with the terminal apparatus 1. The reception map registering section 27 holds information stored in the memory section 31 which includes a plurality of reception maps (respective sets of travel locus/RSSI information, as described hereinafter). Each reception map is stored together with information including a corresponding vehicle type and associated information (expressing the current location of the host vehicle, e.g., a specific road and a specific section of that road, together with a specific travel direction). The travel direction information specifies one of two possible traffic directions, i.e., an "up" direction or a "down" direction along a route, as described above. The reception map distribution section 29 reads out and transmits an appropriate pair of these reception maps to the terminal apparatus 1 in response to a reception map request transmitted from the terminal apparatus 1.

A processing routine which is executed by the terminal apparatus 1 (specifically, by the relative position estimation section 17) repetitively at fixed intervals will be described referring to FIGS. 5 to 10.

Figure 5:
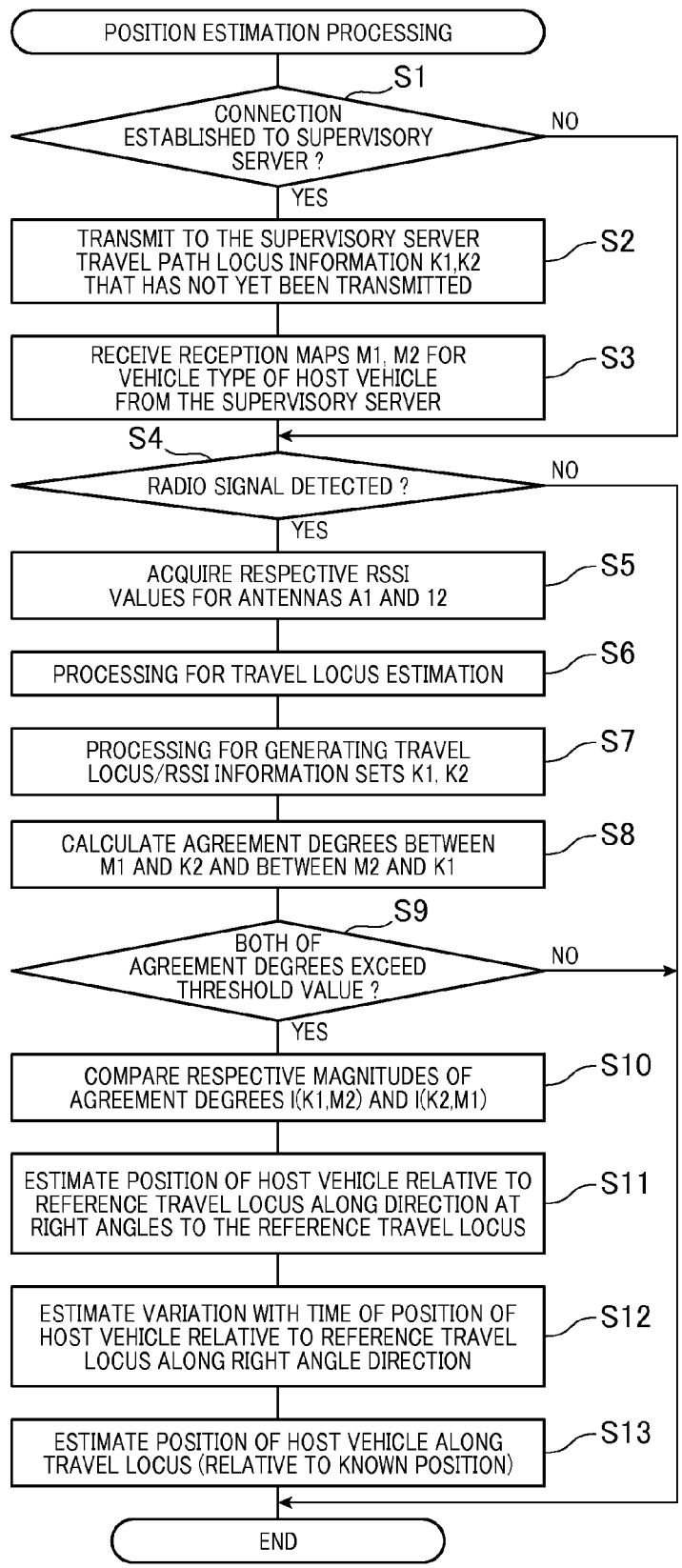
FIG. 5 is a flow diagram for describing a processing routine that is repetitively executed by the terminal apparatus.

Referring first to the flow diagram of FIG. 5, a decision is made in step S1 as to whether data communication with the administrative server 5 is possible. If it is possible (i.e., there is a connection currently established to the administrative server 5 through the Internet) step S2 is then executed, while if not, step S4 is then executed.

In step S2, if there is travel locus/RSSI information that is to be transmitted to the terminal apparatus 1 and has not yet been transmitted, that information is then transmitted to the administrative server 5 using the travel locus information transmission section 21 and the communication apparatus 19. The travel path/RSSI information is transmitted together with the vehicle type of the host vehicle 23, its travel direction (i.e., an "up" or "down" direction as described above), and location information (the road on which the host vehicle 23 was travelling when the travel path/RSSI information was generated, and the section of that road). The location information may be obtained, while the travel path/RSSI information is being generated, by using a GPS (Global Positioning System) apparatus of the host vehicle 23 and stored geographic map data.

In step S3, firstly a request for a reception map is transmitted to the administrative server 5, using the communication apparatus 19. The reception map request is transmitted together with the vehicle type and associated information of the host vehicle 23, i.e., the travel direction and the road and road section where the host vehicle 23 is currently traveling.

A pair of reception maps M1, M2 are then received from the administrative server 5 in response to the request, using the communication apparatus 19. The reception maps are selected by the administrative server 5 in accordance with the vehicle type and associated information of the host vehicle 23.

In step S4, a decision is made as to whether a radio signal is being detected by the antennas A1, A2 (i.e., whether radio waves are being received above a predetermined threshold value of signal strength). If a radio signal is being detected, step S5 is then executed. If none is being detected, this execution of the processing routine is ended.

In step S5, the RSSI value for the antenna A1 (i.e., the RSSI of a radio signal detected using that antenna) is acquired using the first radio communication condition acquisition section 9, and the RSSI for the antenna A1 is acquired using the second radio communication condition acquisition section 11.

Processing for estimating the travel locus of the host vehicle 23 is executed in step S6. The travel locus is obtained, using the travel sensors 13, as a succession of estimated positions reached by the host vehicle 23 as it moves along the travel direction, commencing from the point at which a radio signal started to be detected by the antenna A1, with each estimated position separated from the preceding one by a specific increment of travel distance.

Two sets of travel locus/RSSI information, designated as K1 and K2 respectively, are generated in step S7. (Here, "generated" signifies "updated", if K1 and K2 have already commenced to be generated in a preceding execution of step S7.) The travel locus/RSSI information set K1 relates each of successive positions reached along the travel locus of the host vehicle 23 to the RSSI value obtained at that position using the antenna A1. The travel locus/RSSI information set K2 similarly relates respective positions reached along the travel locus to corresponding RSSI values obtained using the antenna A2.

Figure 6A:
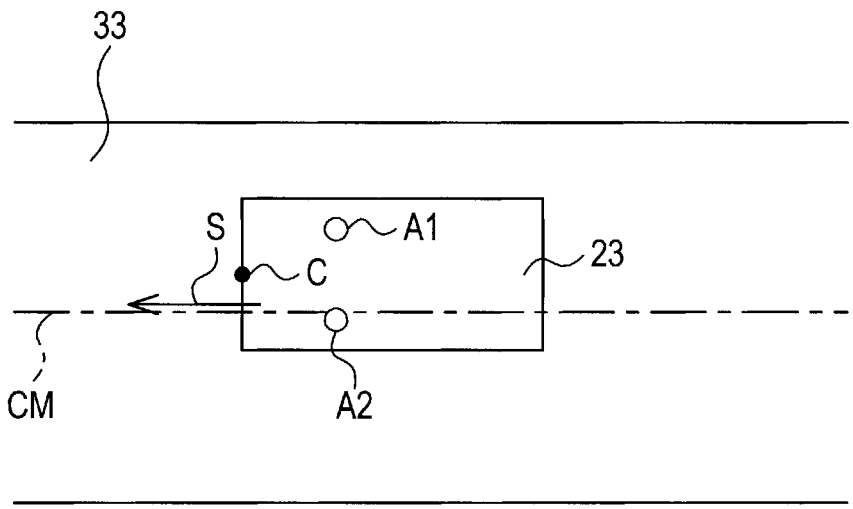
FIG. 6A is a conceptual plan view illustrating a host vehicle travelling in a right-side condition (displaced to the right side of a reference travel locus) and FIG. 6B is a corresponding diagram illustrating the host vehicle travelling in a centered condition (along the reference travel locus)
Figure 6B:
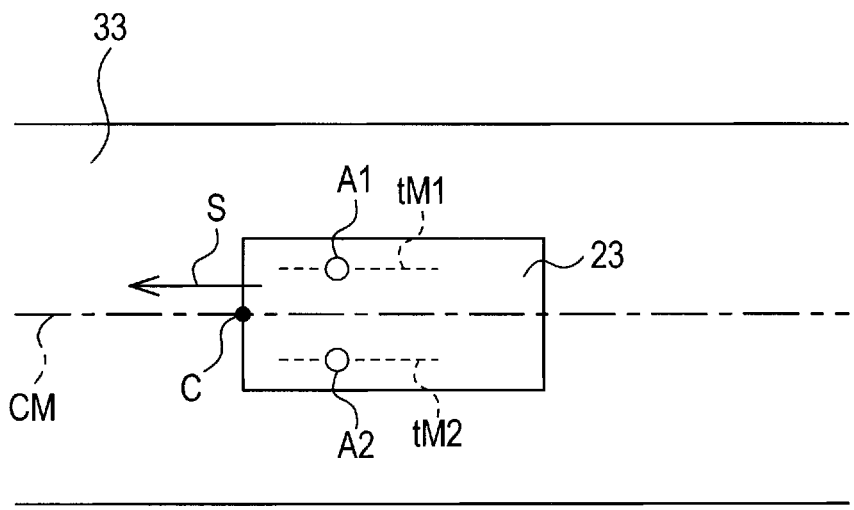

Referring to FIGS. 6A and 6B, these each show the host vehicle 23 travelling along a road 33, with the travel direction of the host vehicle 23 indicated by the arrow S. (The term "road" is used here in a general sense, and the travel locus of the host vehicle 23 may be confined to a traffic lane of a road). For the purpose of description, the travel locus of the host vehicle 23 is specified as that of a center point C (with respect to the width direction) of the vehicle. FIG. 6A illustrates a position condition of the host vehicle 23 referred to in the following as the right-side condition, in which the center point C (and hence the travel locus of the host vehicle 23) is displaced to the right side (as viewed along the advancement direction of the host vehicle 23) of a reference travel locus CM, described hereinafter. FIG. 6B illustrates a position condition of the host vehicle 23 referred to in the following as the centered condition, in which the center point C is aligned with the reference travel locus CM. Although not shown in FIGS. 6A~6C, a position condition in which the center point C is displaced to the left side of the reference travel locus CM is referred to in the following as the left-side condition.

When the host vehicle 23 is travelling as shown in FIGS. 6A and 6B, the terminal apparatus 1 uses the first radio communication condition acquisition section 9 and the second radio communication condition acquisition section 11 to acquire the respective values of RSSI of the antennas A1, A2. Concurrent with this, the terminal apparatus 1 uses the travel sensors 13 and the travel locus estimation section 15 to estimate the travel locus of the host vehicle 23 (i.e., as successive positions defined by successive distance increments along the travel direction, from a reference position).

FIGS. 7A and 7B respectively show examples of the travel locus/RSSI information sets K1 and K2. In each diagram, the horizontal axis is a scale of travel distance and the vertical axis expresses values of RSSI (as obtained using the antenna A1 in FIG. 7A, and as obtained using the antenna A2 in FIG. 7B). It is assumed that the vehicle is traveling along a straight section of its route.

In FIG. 7A, s1 designates the position on the travel locus of the host vehicle 23 at which a radio signal commenced to be detected using the antenna A1 (start position of the travel locus), and e1 designates the travel locus position at the current time. Similarly in FIG. 7B, s2 designates the travel locus position at which a radio signal commenced to be detected using the antenna A2, and e2 designates the travel locus position at the current time.

Reception maps that can be received by the host vehicle 23 from the administrative server 5 will be described in the following. These are of two types, referred to as M1 and M2 reception maps respectively, as illustrated by the examples in FIGS. 7A, 7B. In the same way as for the travel locus/RSSI information sets K1 and K2, an M1 or M2 reception map relates successive positions along a travel locus to corresponding values of RSSI. A M1 or M2 reception map that is transmitted to the host vehicle 23 corresponds to the same vehicle type and same associated information (i.e., same road, section of road, and travel direction) as for the current condition of the host vehicle 23.

Each M1 reception map is generated by the administrative server 5 based on one or more K1 travel locus/RSSI information sets that have been previously generated by the host vehicle 23 (or by a vehicle of the same type) when travelling over the same road and along the same travel direction, and which have been transmitted to the administrative server 5. Each M2 reception map is similarly generated, based on one or more K2 travel locus/RSSI information sets that have been previously generated and transmitted to the administrative server 5. Here "vehicle of the same type as the host vehicle 23 signifies a vehicle having the same physical configuration with respect to factors which affect radio signal reception conditions at positions on the vehicle (i.e., overall shape and dimensions of the vehicle, presence or absence of a roof rack, mounting locations of antennas, etc.)

The reference travel locus CM is the travel locus previously traversed by the host vehicle 23 or by a vehicle of the same type as the host vehicle 23 (along the same road and same travel direction as the host vehicle 23) when generating the reception maps M1 and M2, or the average of respective travel locuses previously traversed by a plurality of such vehicles, whose K1, K2 information was averaged to generate the reception maps M1 and M2.

The current position of the host vehicle 23 in relation to the travel locus CM, along the travel direction, is determined by the distance traveled in the travel direction from a reference position (obtained as described hereinafter).

However with the present invention, the position of the host vehicle 23 relative to the reference travel locus CM with respect to a direction at right angles to the reference travel locus can also be estimated. This enables estimation of changes in position of the host vehicle 23 with respect to a direction at right angles to its advancement direction, since it can be assumed that the reference travel locus CM, at each part of the locus, is generally oriented along the advancement direction of the host vehicle 23, as illustrated in FIGS. 6A, 6B.

The travel locus of the antenna A1, when the travel locus of the host vehicle 23 coincides with the reference travel locus CM (as in the example of FIG. 6B), is designated as tM1. The travel locus of the antenna A2 in that condition is as designated as tM2. That is, when the travel locuses of the antennas A1 and A2 respectively correspond to tM1 and tM2, this indicates that the travel locus of the host vehicle 23 at that time corresponds to the reference travel locus CM.

The administrative server 5 specifies one or more feature points of the reception map M1, such as the feature point Cp1 shown in FIG. 7A. Each feature point may consist of a maximum value, a local maximum value, a local minimum value, etc., of the RSSI, Each feature point corresponds to a ground position having known coordinates, on the route being traveled by the host vehicle 23, and hence can be used as a reference position on the travel locus of the host vehicle 23. Corresponding feature points of the reception map M2 are similarly specified, such as the feature point Cp2 in FIG. 7B. Information relating such feature points in reception maps M1, M2 to their respective positions may for example be transmitted by the administrative server 5 to the host vehicle 23 together with these reception maps.

Figure 8A:
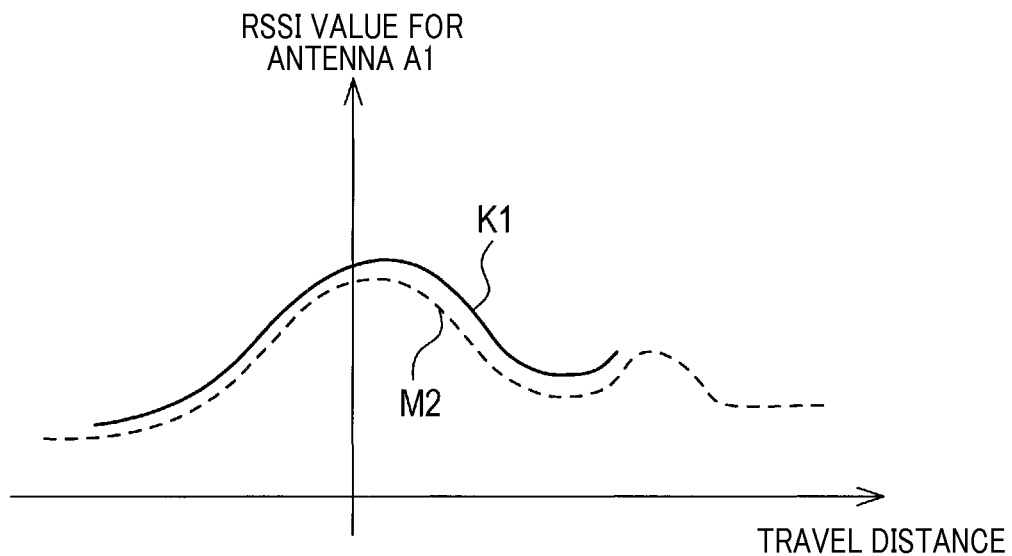
FIG. 8A is a graph showing an example of a combination of travel locus/RSSI information set K1 and a reception map M2.
Figure 8B:
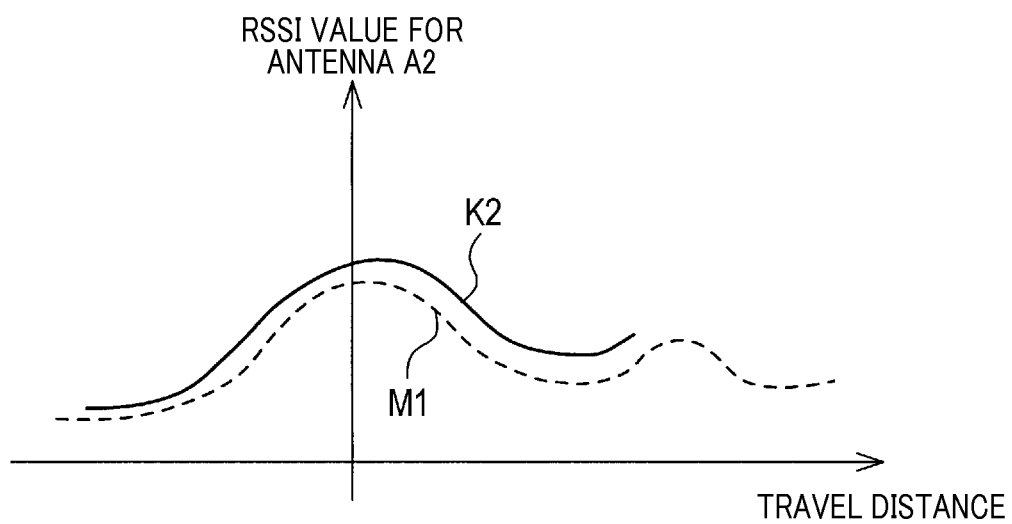
FIG. 8B is a corresponding graph showing example of a combination of travel locus/RSSI information set K2 and a reception map M1.

Returning to FIG. 5, in step S8, firstly, a plurality of combinations of one of the travel locus/RSSI information sets K1 and K2 with one of the reception maps M1 and M2 are determined. With this embodiment, a combination of the travel locus/RSSI information set K1 with the reception map M2 (e.g., as shown in FIG. 8A) and a combination of the travel locus/RSSI information set K2 with the reception map M1 (e.g., as shown in FIG. 8B) are utilized.

Next, respective values of agreement degree are calculated for these combinations. Firstly, the agreement degree I(K1, M2) between the travel locus/RSSI information set K1 and the reception map M2 is calculated, for example as the agreement degree between the K1 and M2 characteristics (RSSI/travel distance characteristics) shown in FIG. 8A. Here, "agreement degree" signifies a value expressing the degree of matching between two open, two-dimensional curves. Since various algorithms for calculating such an agreement degree are known, detailed description is omitted. As a preliminary, processing is executed for successively shifting the travel locus/RSSI information set K1 laterally (i.e., along the travel distance axis as viewed in FIG. 8A) with respect to the reception map M2, until there is maximum closeness between the K1 and M2 characteristics. The magnitude of agreement degree I(K1, M2) between the travel locus/RSSI information set K1 and the reception map M2 in that condition is then calculated. The agreement degree between the travel locus/RSSI information set K2 and the reception map M1 is similarly calculated, designated as I(K2, M1).

More specifically, when the length (travel distance) of a reception map is greater than that of the travel locus/RSSI information set which is being compared, as in the examples of FIGS. 7A, 7B, the comparison (agreement degree calculation) is performed between the travel locus/RSSI information set and the corresponding part of the reception map (i.e., a part having the same length as the travel locus/RSSI information set).

Returning to FIG. 5, in step S9, the magnitudes of the agreement degrees I(K1, M2) and I(K2, M1) are each compared with a predetermined threshold value. If both of the agreement degrees I(K1, M2) and I(K2, M1) exceed the threshold value, step S10 is then executed. If at least one of I(K1, M2) and I(K2, M1) does not exceed the threshold value, this execution of the processing routine is ended.

In step S10, the respective magnitudes of the agreement degrees I(K1, M2) and I(K2, M1) are compared.

In step S11, based on the magnitude relationship of the agreement degrees I(K1, M2) and I(K2, M1) determined in step S10, an estimate is made of the degree of displacement of the host vehicle 23 from the reference travel locus CM in a direction at right angles to the reference travel locus CM, and (if there is displacement) whether the host vehicle 23 is in the right-side condition or the left-side condition.

The association between the magnitude relationship of the agreement degrees I(K1, M2) and I(K2, M1) and the position of the host vehicle 23 relative to the reference travel locus CM is as follows.

Figure 9A:
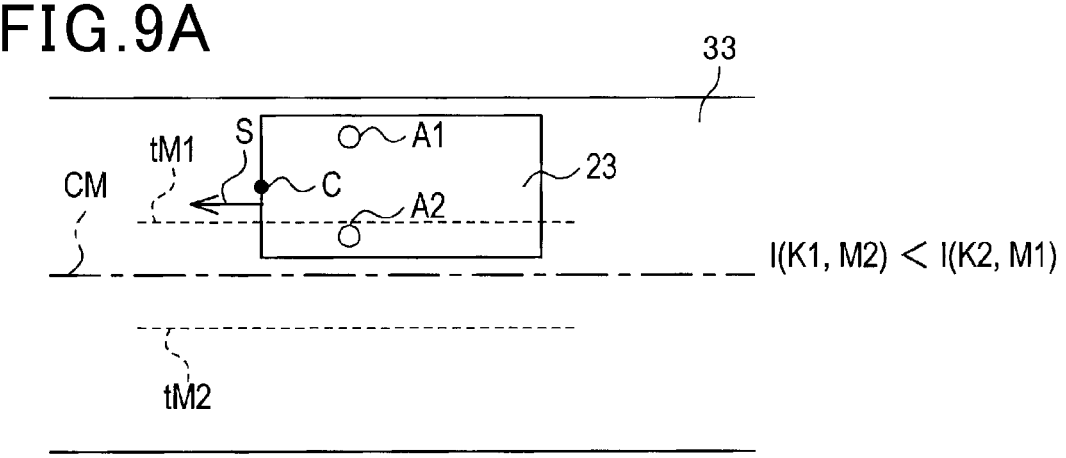
FIGS. 9A, 9B and 9C are conceptual plan views for describing how magnitude relationships between two values of agreement degree are related to the position of a host vehicle relative to a reference travel locus.

As shown in FIG. 9A, when the host vehicle 23 is in the right-side condition, the antenna A1 (i.e., the travel locus of the antenna A1 at that time) and the travel locus tM2 are distant from one another, while the antenna A2 and the travel locus tM1 are close together. Hence in this condition, the agreement degree I(K2, M1) is greater than the agreement degree I(K1, M2).

Figure 9B:
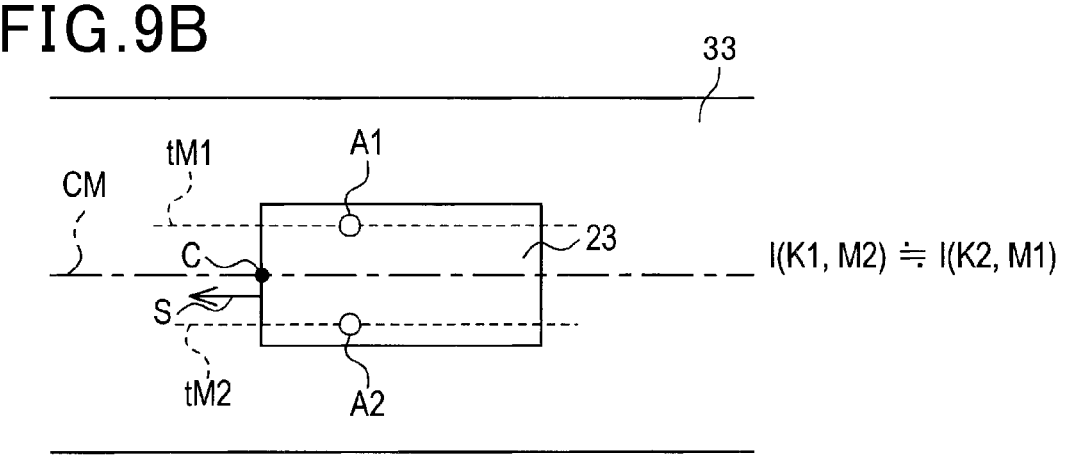

As shown in FIG. 9B, when the host vehicle 23 is in the centered condition, the separation between the antenna A1 and the travel locus tM2 is substantially equal to the separation between the antenna A2 and the travel locus tM1. Hence in this condition, the agreement degrees I(K2, M1) and I(K1, M2) are substantially equal to one another.

Figure 9C:
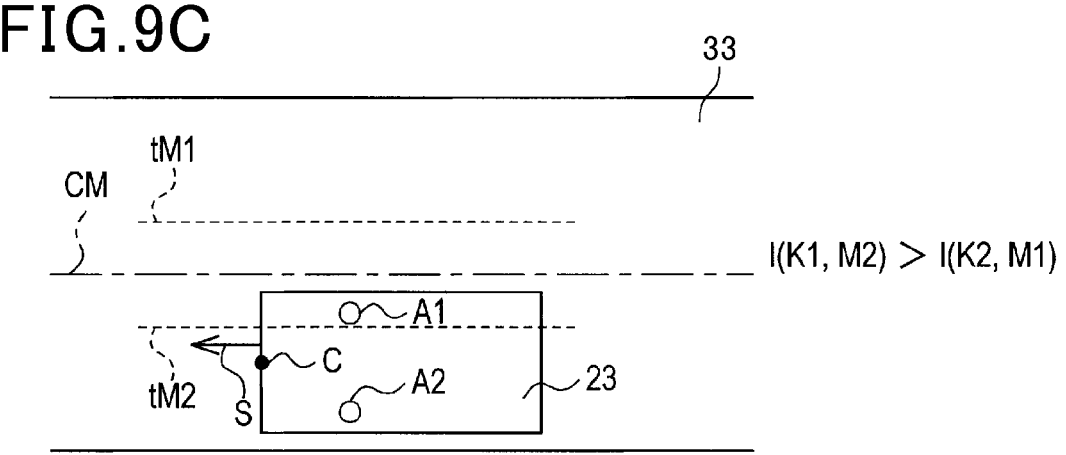

As shown in FIG. 9C, when the host vehicle 23 is in the left-side condition (as defined hereinabove), the antenna A1 is close to the travel locus tM2 while the antenna A2 is distant from the travel locus tM1. Hence in this condition, the agreement degree I(K2, M1) is less than the agreement degree I(K1, M2).

Hence there is a correlation between the magnitude relationship of the agreement degrees I(K2, M1), I(K1, M2) and the position of the host vehicle 23 relative to the reference travel locus CM, as measured in a direction at right angles to the reference travel locus CM. The terminal apparatus 1 thus estimates the position of the host vehicle 23 relative to the reference travel locus CM, along a direction at right angles to the reference travel locus CM, based on the magnitude relationship between the agreement degrees I(K2, M1) and I(K1, M2).

Specifically, if I(K2, M1)>I(K1, M2), it is estimated that the host vehicle 23 is in the right-side condition, while if I(K2, M1) and I(K1, M2) are substantially identical then it is estimated that the host vehicle 23 is in the centered condition, and if I(K2, M1)<I(K1, M2), it is estimated that the host vehicle 23 is in the left-side condition.

Returning to FIG. 5, in step S12, firstly the agreement degree I(K1, M1)) between the travel locus/RSSI information set K1 and the reception map M1 and the agreement degree I(K2, M2) between the travel locus/RSSI information set K2 and the reception map M2 are calculated, in addition to the agreement degrees I(K1, M2) and I(K2, M1). The reason for this is as follows. Information is stored beforehand, in a memory such as a ROM of the terminal apparatus 1, which expresses a pattern of correlation between time-axis variation of the magnitude relationships between the agreement degrees I(Ki, Mj) (i=1, 2, j=1, 2) and time-axis variation of the position of the host vehicle 23 with respect to the reference travel locus CM, as measured along a direction at right angles to the reference travel locus CM.

Such correlation pattern information may specify, for example, that the following sequence of magnitude relationships (i) to (iv) occurs when the position of the host vehicle 23 with respect to the reference travel locus CM along a direction at right angles to the reference travel locus CM changes sequentially in the order

[left-side condition→centered condition→right-side condition]:

(i) agreement degree I(K1, M2)>agreement degree I(K1, M1)

(ii) agreement degree I(K1, M2)<agreement degree I(K1, M1)

(iii) agreement degree I(K2, M2)>agreement degree I(K2, M1)

(iv) agreement degree I(K2, M2)<agreement degree I(K2, M1)

Figure 10A:
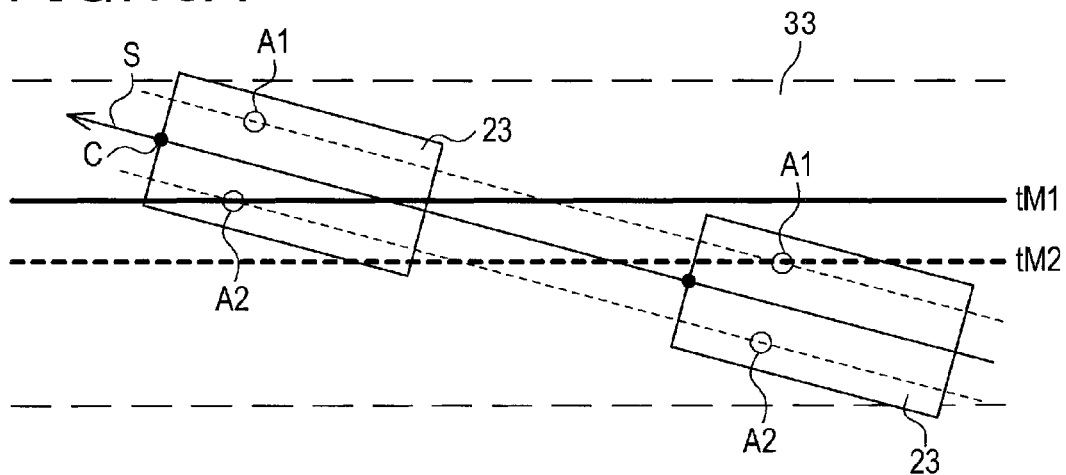
FIG. 10A is a conceptual plan view illustrating a host vehicle travelling successively from a position displaced to the left side of the reference travel locus, to a position at the center line, and to a position displaced to the right side of the reference travel locus.
Figure 10B:
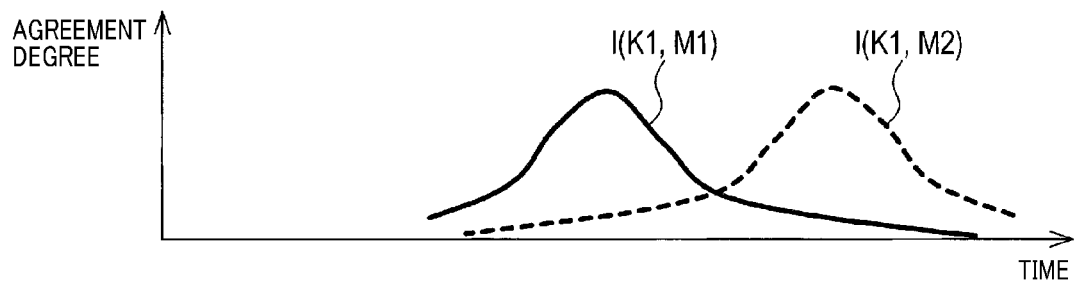
FIGS. 10B, 10C are corresponding graphs illustrating time-axis variation of magnitudes of agreement degree as the vehicle position varies.
Figure 10C:
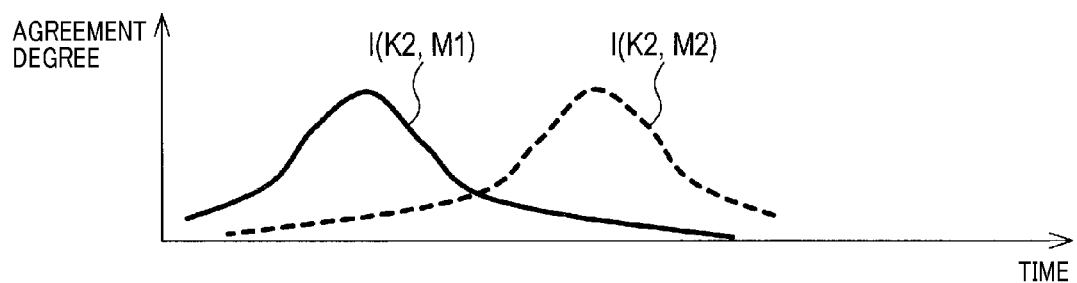

This is illustrated in FIGS. 10A to 10C, in which FIG. 10A shows the position of the host vehicle 23 successively changing in a direction at right angles to the reference travel locus CM, i.e., shows the advancement direction S of the host vehicle 23 angularly displaced from the travel locuses tM1, tM2, and so angularly displaced from the advancement direction for the road 33. FIG. 10B shows the corresponding variation of the agreement degrees I(K1, M1) and I(K1, M2) with time, while FIG. 10C shows the corresponding variation of the agreement degrees I(K2, M1) and I(K2, M2) with time, so that the above sequence of magnitude relationships (i) to (iv) occurs.

Based on the time-axis variation of these magnitude relationships between the agreement degrees I(Ki, Mj), the terminal apparatus 1 estimates the variation over time of the position of the host vehicle 23 relative to the reference travel locus CM along a direction at right angles to the reference travel locus CM. For example if it is found that the magnitude relationships have successively changed (or are changing) in the sequence (i) to (iv) above, it is judged that the host vehicle 23 has moved (or is moving) successively from the left-side condition to the centered condition and then to the right-side condition.

Similarly, the terminal apparatus 1 has information stored beforehand which expresses a pattern of correlation between time-axis variation of the magnitude relationships between the agreement degrees I(Ki, Mj) and successive changes with time of the position of the host vehicle 23 relative to the reference travel locus CM along a direction at right angles to CM in the sequence:

[right-side condition→centered condition→left-side condition].

If it is found that the magnitude relationships have successively changed (or are changing) in accordance with that correlation pattern, the terminal apparatus 1 judges that the host vehicle 23 has moved (or is moving) successively from the right-side condition to the centered condition and then to the left-side condition.

Returning to FIG. 5, in step S13, the current position of the host vehicle 23 along its travel locus is estimated as follows. FIG. 7A shows a condition in which the travel locus/RSSI information set K1 has been shifted to a position of maximum agreement with the reception map M1, with the reception map M1 expressing a feature point Cp1 as described above. s1 is the travel locus position of the host vehicle 23 at which the terminal apparatus 1 commenced generating the travel locus/RSSI information set K1, and e1 designates the latest travel locus position reached by the host vehicle 23. The total distance traveled along the route of the host vehicle 23 in the travel direction, from the known position corresponding to Cp1 to the latest position e1 of the host vehicle 23, is designated as D. Hence, the position e1 is determined, i.e., as the position reached by traveling the distance D along the travel locus of the host vehicle 23 (with this embodiment, along a known road) in a known direction, from a known reference position.

3. Processing Executed by the Administrative Server 5

(3-1) Reception Map Updating Processing

Figure 11:
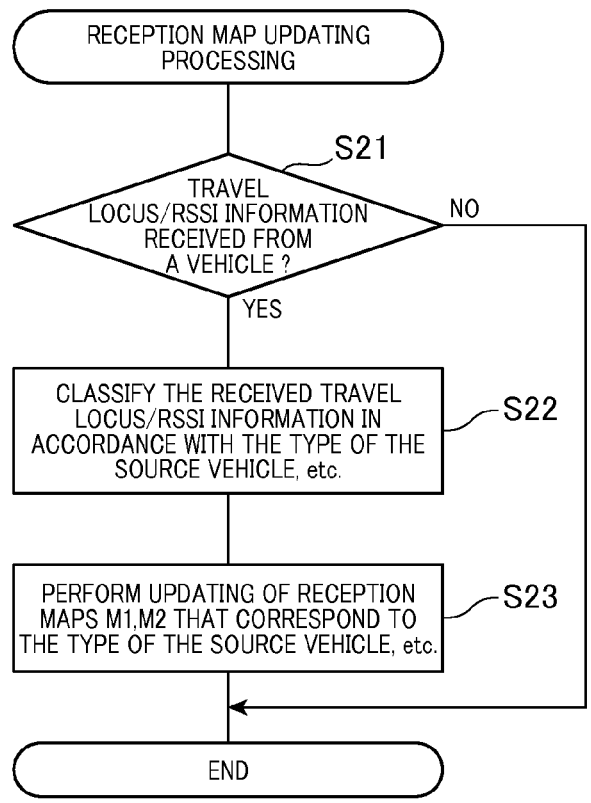
FIG. 11 is a flow diagram for describing a reception map updating processing routine that is repetitively executed by the administrative server of the first embodiment.

The reception map updating processing routine shown in FIG. 11 is executed by the reception map registering section 27 of the administrative server 5 repetitively at fixed intervals. Firstly in step S21 a decision is made as to whether new travel locus/RSSI information K1, K2 has been received by the communication apparatus 25. If it has been received, step S22 is then executed, while if it has not been received, this execution of the processing routine is ended.

The travel locus/RSSI information K1, K2 is information that has been transmitted by the terminal apparatus 1 in the processing of step S2 of FIG. 5 above.

In step S22, the contents of the travel locus/RSSI information K1, K2 received in step S21 are categorized according to the vehicle type and the associated information (i.e., the road traveled, the section of that road, and the travel direction). The categorized information is then stored in the memory section 31.

In step S23, the memory section 31 reads out from the memory section 31 each of respective pairs of travel locus/RSSI information sets K1, K2 that have been received up to the present and that correspond to the same vehicle type, same road and same travel direction as the host vehicle 23. If only a single pair of such sets of travel locus/RSSI information K1, K2 have been received so far, these is stored unchanged as reception maps M1, M2 for the vehicle type of the host vehicle 23 and for the travel direction and road specified with the information K1, K2.

However if a plurality of sets of travel locus/RSSI information K1, K2 have been received and stored in the memory section these are read out and the average of these is calculated, to obtain corresponding M1 and M2 reception maps. Specifically, for each travel locus position in a plurality of K1, K2 information sets, the average of the corresponding RSSI values is calculated, to obtain the RSSI value (for that travel locus position) of the corresponding M1 or M2 reception map. The obtained reception maps M1 and M2 are then stored. Each time that new travel locus/RSSI information K1, K2 for the same vehicle type and associated information (location and travel direction) as the host vehicle 23 is received, the reception maps M1 and M2 are read out and updated, by the averaging calculation described above.

The position coordinates corresponding to each of one or more feature points such as Cp1 defined in the reception maps M1 and M2 are also determined, and notified to the host vehicle 23, for use as reference travel locus positions as described above.

(3-2) Reception Map Transmission Processing

Figure 12:
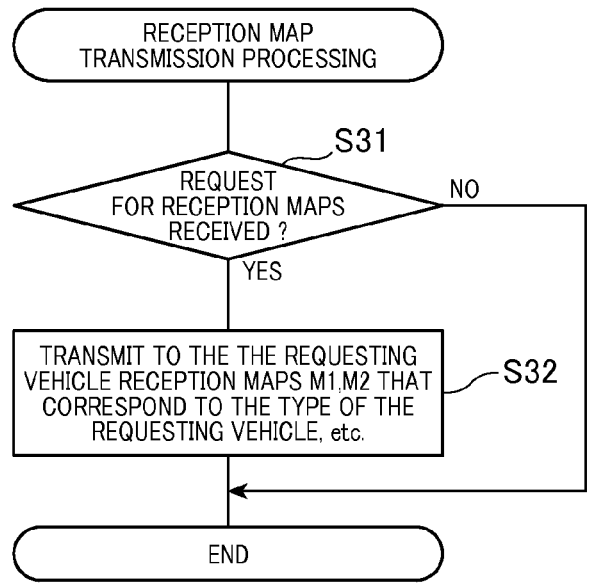
FIG. 12 is a flow diagram for describing a reception map transmission processing routine that is repetitively executed by the administrative server.

The reception map updating processing routine shown in FIG. 12 is executed by the reception map registering section 27 of the administrative server 5 repetitively at fixed intervals.

Firstly in step S31, a decision is made as to whether a reception map request has been received by the communication apparatus 25. If such a request has been received, step S32 is then executed, while if a request has not been received, this execution of the processing routine is ended. A reception map request is generated by the terminal apparatus 1 in step S3 of FIG. 5 above.

In step S32 the most recently updated reception maps M1, M2 which correspond to the information contained in the reception map request (i.e., which are for the same vehicle type, location and travel direction as the requesting vehicle) are transmitted to the requesting vehicle, e.g., the host vehicle 23.

4. Effects Obtained (1A) The terminal apparatus 1 enables the position of the host vehicle 23 relative to the reference travel locus CM to be estimated.

(1B) The positions of the antennas A1, A2 are oriented along a direction that is at right angles to the longitudinal axis of the host vehicle 23, hence, that is at right angles to the advancement direction of the host vehicle 23, and so can be assumed to be at right angles to the travel direction for the host vehicle 23. As a result, by estimating changes in the position of the host vehicle 23 with respect to a reference travel locus, as measured along a direction at right angles to the reference travel locus, based on respective reception conditions at these antenna positions, changes in the position of the host vehicle 23 along a direction at right angles to the travel direction can be estimated.

(1C) As a result of effect 1B, the terminal apparatus 1 can detect changes with time of the position of the host vehicle 23 along a direction at right angles to its (required) travel direction. Thus for example if the host vehicle 23 begins to veer towards the right side or the left side of the road on which it is travelling, this can be quickly detected by the terminal apparatus 1.

The function of the travel sensors 13 for estimating values of distance traveled by the host vehicle 23 can be implemented by an apparatus which detects amounts of rotation of road wheels of the vehicle, for example. The function for acquiring the current locality (road and road section) of the host vehicle 23, to be notified to the administrative server 5, can be implemented by a GPS apparatus and stored geographic maps (road maps). The functions of the first and second radio communication condition acquisition sections 9 can be implemented by respective radio receiving apparatuses having a RSSI measurement capability. The respective functions of the travel locus estimation section 15, the relative position estimation section 17, the a communication apparatus 19 and the travel locus information transmission section 21 can be implemented by a computer in executing a program that has been stored beforehand.

Second Embodiment

1. Configuration of Terminal Apparatus 1 and Position Estimation System 3

The configurations of the terminal apparatus 1 and the position estimation system 3 of the second embodiment are basically identical to those of the first embodiment. However with the second embodiment, a GPS apparatus and stored geographic map data are also used to detect when the host vehicle 23 is driving along a curved section of a road, and to obtain the radius of curvature of the curved section.

The relative position estimation section 17 of this embodiment is an example of a compensation unit, as recited in the appended claims.

2. Processing Executed by the Terminal Apparatus 1

The processing executed by the terminal apparatus 1 of this embodiment is basically identical to that of the first embodiment, and only the points of difference are specifically described in the following, referring first to the flow diagram of FIG. 13A. The contents of steps S42 to S45 of FIG. 13A are shown in more detail in the partial flow diagram of FIG. 13B.

Firstly in step S41 a decision is made as to whether the host vehicle 23 is currently travelling around a curved section of a road. If it is travelling around such a curved section, step S42 is then executed, while otherwise step S46 is executed.

Figure 13A:
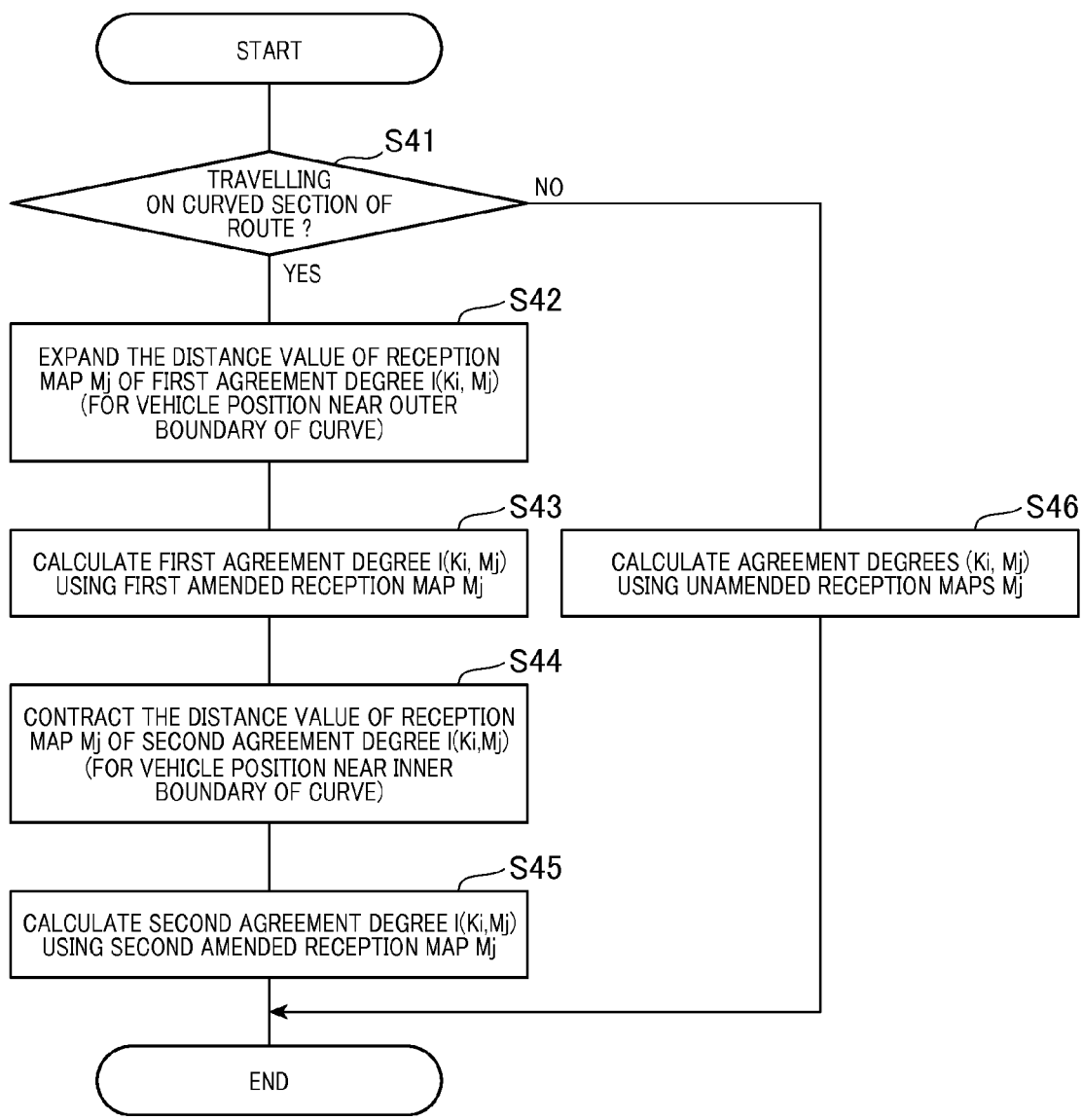
FIGS. 13A and 13B are flow diagrams for describing an agreement degree calculation processing routine that is executed with a second embodiment.

The basis for steps S42 and S44 of FIG. 13A is as follows.

Figure 14:
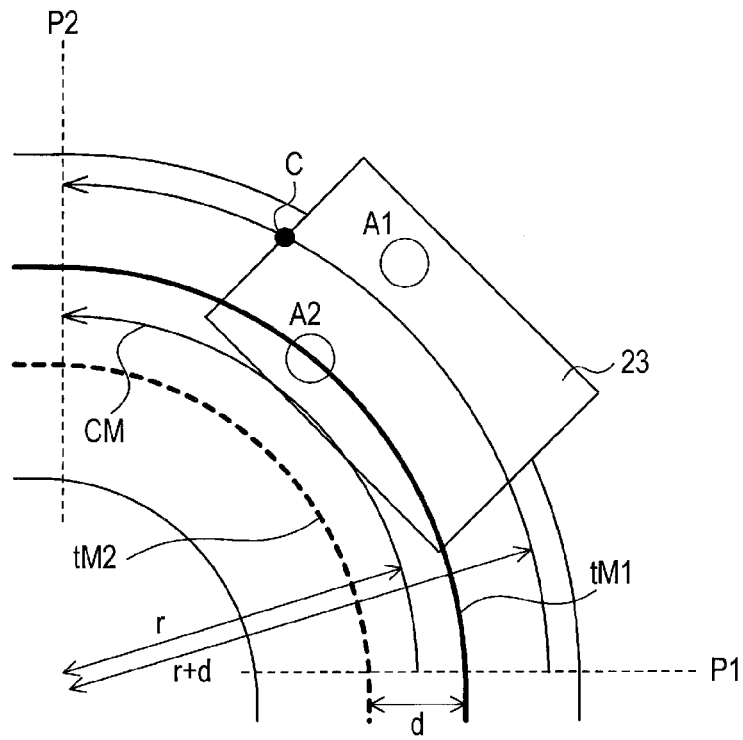
FIG. 14 is a conceptual plan view illustrating a host vehicle travelling around a curved section of a road, with the vehicle position displaced toward the outside of the curve.

Referring to FIG. 14, this illustrates a condition in which the host vehicle 23 is travelling along a curved section of a road 34, with a section of the reference travel locus CM being curved accordingly, between positions P1 and P2. The direction of curvature is to the left (i.e., counterclockwise direction) with respect to the travel direction of the host vehicle 23. It is assumed that travel path/RSSI information sets K1, K2 are obtained for the curved section between the positions P1 and P2. The host vehicle 23 is positioned close to the outer boundary of the curved section. When the host vehicle 23 is centrally positioned (i.e., is following the reference travel locus CM), the length of the travel locus of the host vehicle 23 between positions P1 and P2 is the length of the reference travel locus CM between these positions. For simplicity of calculation, this is also the length assumed for the distance traveled by each of the antennas A1 and A2 between positions P1 and P2 (i.e., the respective lengths of the travel locuses tM1, tM2 of the reception maps M1 and M2 between the positions P1, P2), when the host vehicle 23 is following the reference travel locus CM.

However if the host vehicle 23 is actually displaced from the reference travel locus CM, near the outer boundary of the curved section of the road (i.e., is displaced from the reference travel locus CM, toward the outer boundary of the curved section) as shown in FIG. 14, then the travel locus length of the travel locus/RSSI information set K2 (distance traveled by the center point C between positions P1, P2) will be greater (i.e., since measured along a longer arc of the curved section) than the length of the reception map M1 between the positions P1, P2. Hence it will not be possible to reliably calculate the agreement degree between the reception map M1 and the travel locus/RSSI information set K2.

For that reason, if the host vehicle 23 is positioned close to the outer boundary of the curved section of the road, the value of travel locus length (travel distance) of the part of the reception map M1 corresponding to the curved section is expanded, by being multiplied by a factor (r+d)/r where r is the radius of curvature of the curved section and d is the distance between the positions of the antennas A1, A2 on the host vehicle 23. The agreement degree I(K2, M1) can thereby be more accurately estimated.

Figure 15:
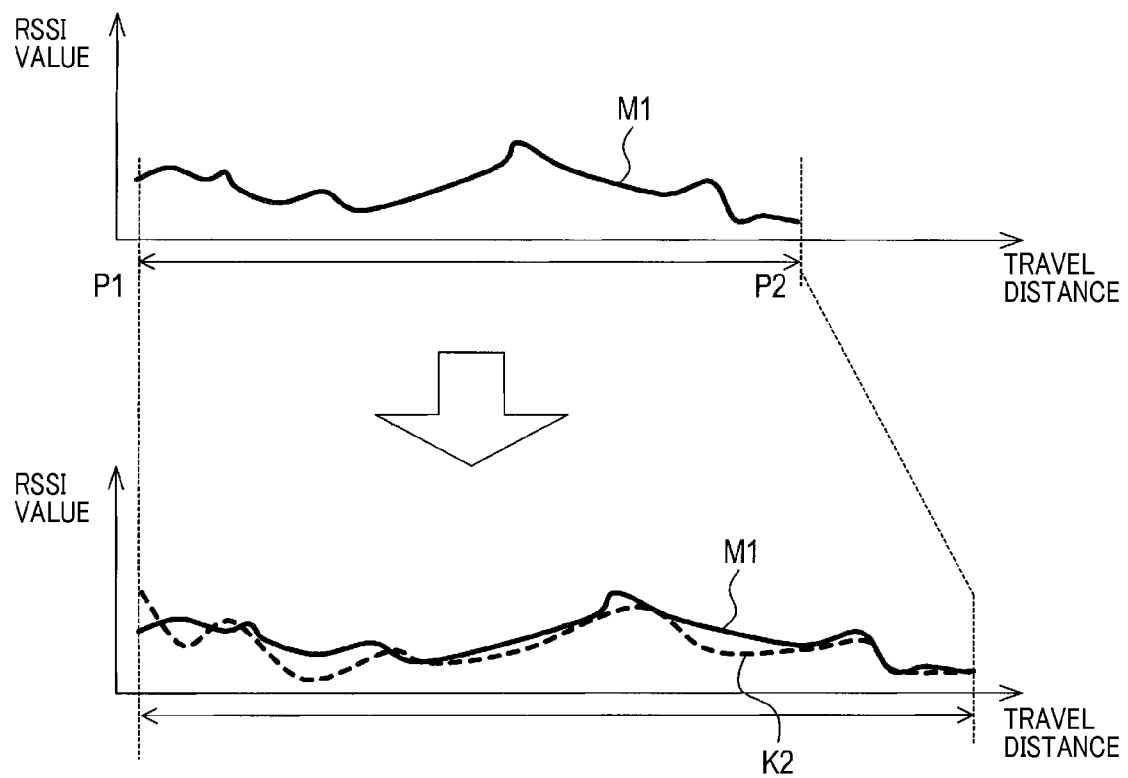
FIG. 15 shows graphs illustrating a manner of increasing the length (travel distance) of a reception map with the second embodiment.

The effect of this is illustrated in FIG. 15. With this embodiment, the separation value between the antennas A1, A2 is used as the value of d.

Similarly (when the curved section curves to the left of the advancement direction of the host vehicle 23 as in FIG. 14), if the host vehicle 23 is displaced close to the inner circumference of the curved section of the road (i.e., is displaced from the reference travel locus CM, toward the inner boundary of the curved section), the length of the travel locus/RSSI information set K1 will be shorter than the travel locus length of the reception map M2 in the curved section. Hence in that case, the length of the part of the reception map M2 corresponding to the curved section is contracted, by being multiplied by a factor r/(r+d).

For similar reasons, if the curved section curves to the right, and the host vehicle 23 is displaced close to the outer circumference of the curved section, the travel locus length of the part of the reception map M2 corresponding to the curved section is expanded (i.e., the reception map corresponding to the agreement degree I(K1, M2)).

Hence in step S42 of FIG. 13A, the terminal apparatus 1 selects the reception map Mj (M1 in the case of left-direction curvature, M2 in the case of right-direction curvature) corresponding to the agreement degree I(Ki, Mj) whose value becomes increased when the host vehicle 23 is close to the outer periphery of the curved section by comparison with the case in which the host vehicle 23 follows the reference travel locus CM, and expands the travel locus length of the curve section of the selected reception map by multiplying by the factor (r+d)/r.

The agreement degree I(Ki, Mj) corresponding to the amended reception map is then calculated, in step S43.

Similarly in step S44, the terminal apparatus 1 selects the reception map Mj (M2 in the case of left-direction curvature, M1 in the case of left-direction curvature) corresponding to the agreement degree I(Ki, Mj) whose value becomes increased when the host vehicle 23 is close to the inner periphery of the curved section by comparison with the case in which the host vehicle 23 follows the reference travel locus CM, and contracts the travel locus length of the curve section of the selected reception map by multiplying by the factor r/(r+d).

The agreement degree I(Ki, Mj) corresponding to the amended reception map is then calculated, in step S45.

If there is a NO decision in step S41, then step S46 is executed, in which the agreement degrees I(K2, M1) and I(K1, M2) are calculated by using the reception maps M1 and M2 respectively unchanged.

Figure 13B:
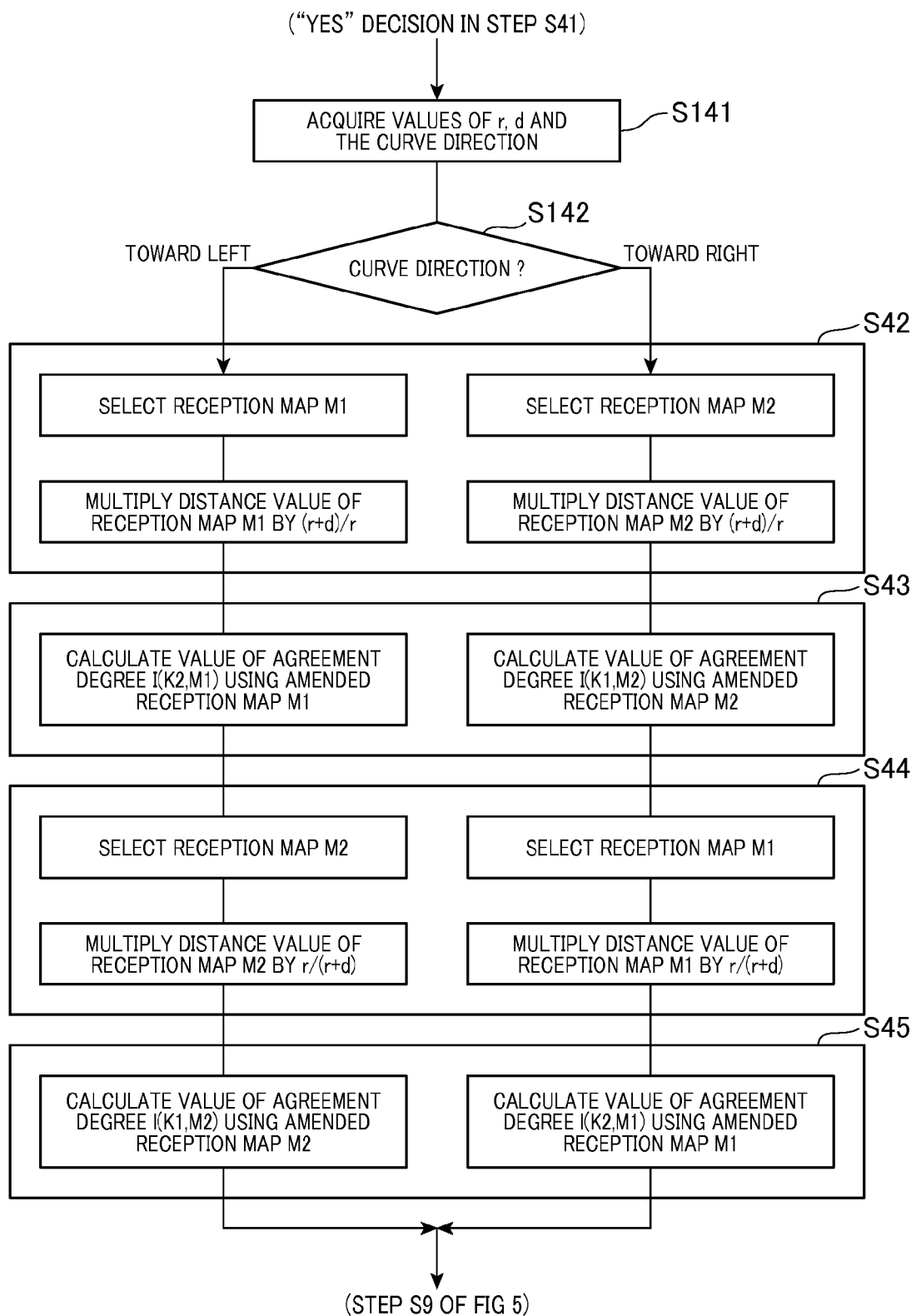

FIG. 13B is a partial flow diagram showing the processing of steps S42 to S45 of FIG. 13A more specifically. As shown in FIG. 13B, the terminal apparatus 1 first acquires information specifying the radius of curvature r, the distance d, and the direction of curvature of the curved section. Subsequent processing of steps S42 to S45 is then executed as described above, in accordance with whether the direction of curvature is to the left or the right with respect to the travel direction of the host vehicle 23.

3. Processing Executed by Administrative Server 5

The administrative server 5 of this embodiment executes the same processing as that described for the first embodiment.

4. Effects Obtained by Terminal Apparatus 1

The second embodiment provides the following effects, in addition to the effects obtained with the first embodiment.

(2A) When the host vehicle 23 is traversing a curved section of the reference travel locus, the terminal apparatus 1 expands the length (i.e., travel locus distance) of the reception map Mj of a first one of the agreement degrees I(Ki, Mj), which is an agreement degree that becomes increased when the host vehicle 23 travels around the curved section at a position separated radially outward from the reference travel locus (e.g., positioned near the outer boundary of a curved section of a road or travel lane).

As a result of this compensation, if the host vehicle 23 is actually positioned close to the outer circumference of the curved section when traversing that section of the travel locus, the first one of the agreement degrees I(Ki, Mj) can be more accurately calculated, by suppressing an error due to the increased distance traveled (along an outer arc) by comparison with travel along the reference travel locus CM. Hence the position of the host vehicle relative to the reference travel locus CM can be more accurately estimated.

(2B) In addition, when the host vehicle 23 is traversing a curved section of the reference travel locus, the terminal apparatus 1 contracts the length of the reception map Mj of a second one of the agreement degrees I(Ki, Mj), which is an agreement degree that becomes increased when the host vehicle 23 travels around the curved section at a position radially inward from the reference travel locus (e.g., positioned near the inner circumference of a curved section of a road or travel lane)).

As a result of this compensation of the reception map distance, if the host vehicle 23 is actually positioned close to the inner circumference when traversing the curved section, the second one of the agreement degrees I(Ki, Mj) can be more accurately calculated, by suppressing an error due to the decreased distance traveled (along an inner arc), by comparison with travel along the reference travel locus CM. Hence the position of the host vehicle relative to the reference travel locus CM can be more accurately estimated.

Third Embodiment

Figure 16A:
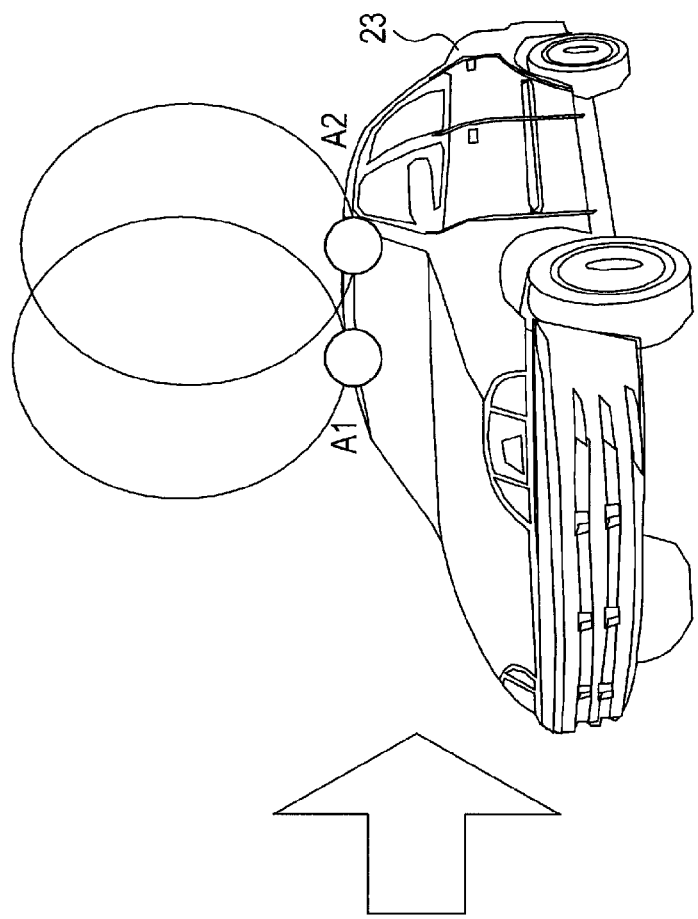
FIGS. 16A, 16B are diagrams illustrating adjustment of the directivities of two vehicle-mounted antennas with a third embodiment.
Figure 16B:
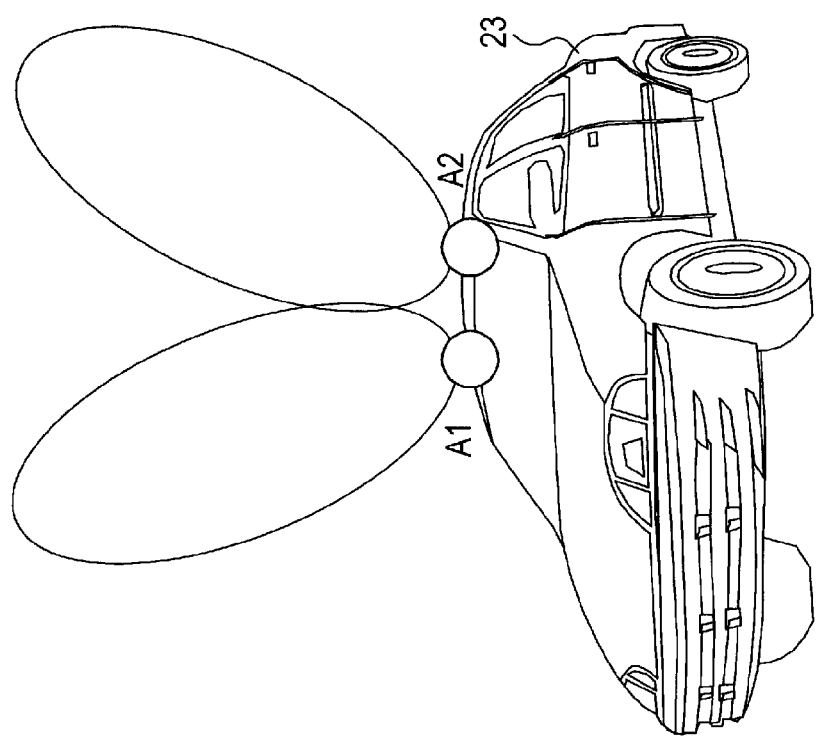

1. Configurations of Terminal Apparatus 1 and Position Estimation System 3 of Third Embodiment The configurations of the terminal apparatus 1 and position estimation system 3 of a third embodiment are basically identical to those of the first embodiment. However in the case of the third embodiment as illustrated in FIGS. 16A, 16B, the terminal apparatus 1 has a function for adjusting the directivities of the antennas A1 and A2. The directivity adjustment function can be implemented by adjustment of the attachment elements of the antennas A1 and A2. Alternatively, active array antennas can be used as the antennas A1 and A2, with the directivity adjustment function being implemented by signal processing.

The directivities of the antennas A1 and A2 may be adjusted to be identical to one another. The adjustment settings may be determined based on computer simulation, using an identical vehicle configuration to that of the host vehicle for the simulation (i.e., with respect to vehicle type, presence or absence of a roof rack, etc.).

2. Processing Executed by the Administrative Server 5

The processing executed by the administrative server 5 of this embodiment is identical to that of the first embodiment.

3. Effects Obtained by Terminal Apparatus 1

With the third embodiment, the following effect identifier obtained in addition to the effects (1A) to (1C) obtained with the first embodiment:

(3A) The directivities of the antennas A1 and A2 can be made identical to one another by the terminal apparatus 1, for each of respective vehicles that are of the same type and configuration (i.e., with respect to presence or absence of a roof rack, etc.).

Other Embodiments

The present invention is not limited to the embodiments described above, and various other embodiments or modified forms of the above embodiments may be envisaged which fall within the scope set out for the invention in the appended claims. Examples of such other embodiments or modified forms are as follows.

(1) A terminal apparatus according to the present invention is not limited in application to a vehicle whose travel locuses are confined to roads, but would be applicable to vehicles in general, including railroad trains, ships, aircraft, etc.

(2) The number of antennas connected to the terminal apparatus could be three or more. In that case, all of the antennas or only a part of these could be used in generating the travel locus/RSSI information.

(3) The radio communication condition, used in generating the travel locus/RSSI information, is not necessarily limited to being judged based on RSSI values. It could equally be judged based on the direction of change of received signal strength, or (in the case of received radio waves that are modulated to convey a plurality of sub-channels) the phase difference between adjacent sub-channels, or the received signal strength of a single sub-channel, etc.

(4) The terminal apparatus need not necessarily receive the reception maps M1 and M2 from an administrative server 5. The reception maps M1 and M2 could for example be stored beforehand, in a memory device of the terminal apparatus 1.

(5) With the first to third embodiments described above, it is assumed that the agreement degrees $I(K_i, M_j)$ calculated in step S8 of FIG. 5 are $I(K_1, M_2)$ and $I(K_2, M_1)$. However the invention is not limited to this. It would be equally possible to calculate the agreement degrees $I(K_2, M_2)$ and $I(K_2, M_1)$. In that case if the agreement degree $I(K_2, M_2) < I(K_2, M_1)$, it will be estimated in the comparison processing of step S10 that the host vehicle is in the right-side condition.

Furthermore it would be equally possible to calculate all of the agreement degrees $I(K_2, M_2)$, $I(K_2, M_1)$, $I(K_1, M_2)$ and $I(K_1, M_1)$ as $I(K_i, M_j)$ in step S8 of FIG. 5. In that case, for example if the agreement degree $I(K_2, M_2) < I(K_2, M_1)$ and $I(K_1, M_2) < I(K_1, M_1)$, then it will be estimated in step S10 that the host vehicle is in the right-side condition.

(6) In step S12 of FIG. 5, with the first to third embodiments above, it would be possible to use other methods of estimating changes in the position of the host vehicle with respect to time. For example if change occurs in the agreement degree relationships in the following sequence (I')~(ii') then it can be judged that the position of the host vehicle relative to the reference travel locus CM is changing towards the right-side condition:

(I') $I(K_2, M_2) > I(K_2, M_1)$
(ii') $I(K_2, M_2) < I(K_2, M_1)$

Similarly, if change occurs in the agreement degree relationships in the following sequence (I")~(ii") then it can be judged that the position of the host vehicle relative to the reference travel locus CM is changing towards the right-side condition:

(I') $I(K_1, M_2) > I(K_1, M_1)$
(ii') $I(K_1, M_2) < I(K_2, M_1)$ (7) In step S42 of FIG. 13A for the second embodiment, instead of expanding the distance corresponding to a reception map Mj of an agreement degree $I(K_i, M_j)$, it would be equally possible to contract the length (travel distance) of the travel locus/RSSI information Ki. Alternatively, it would be possible to expand the length corresponding to the reception map Mj while also contracting the length of the travel locus/RSSI information Ki.

Similarly in step S44 of FIG. 13A for the second embodiment, instead of contracting the travel distance corresponding to the reception map Mj, it would be equally possible to expand the length of the travel locus/RSSI information Ki. Alternatively, it would be possible to contract the length corresponding to the reception map Mj while also expanding the length of the travel locus/RSSI information Ki.

(8) With each of the first to third embodiments, the radio waves received by the antennas A1, A2 of the terminal apparatus could be transmitted from a base station situated at a known ground position, e.g., which transmits a radio beacon signal.

(9) With each of the first to third embodiments, when comparing the magnitudes of the two agreement degrees $I(K_i, M_j)$ in the processing of steps S10 and S10, it would be possible to multiply one of the agreement degrees by a fixed coefficient K before performing the magnitude comparison.

(10) It would be possible to disperse elements of one embodiment among a plurality of other embodiments, or to combine elements from a plurality of embodiments as a single element of an embodiment. Furthermore the invention is not limited to the configurations of the embodiments described above, and it might be possible to use known configurations for performing some of the functions described. Furthermore it would be possible to omit parts of the configurations of the described embodiments, or to add a part of another embodiment to the configuration of an embodiment, or replace a part of the configuration of an embodiment by a part of another embodiment.

What is claimed is:

1. A terminal apparatus installed on a host vehicle, comprising
a radio communication condition acquisition unit configured for acquiring respective radio communication conditions of a plurality of radio communication positions on the host vehicle,
a travel locus/condition information generating unit configured for generating a plurality of sets of travel locus/condition information respectively corresponding to the radio communication positions on the host vehicle, the travel locus/condition information for a radio communication position expressing the radio communication condition at each of respective positions on a travel locus of the host vehicle, the travel locus comprising positions successively attained by the host vehicle when moving along a specific travel direction, and a reception map acquisition unit configured for acquiring a plurality of reception maps respectively corresponding to the radio communication positions on the host vehicle, each of the reception maps comprising travel locus/condition information previously generated by the terminal apparatus of the host vehicle or of a vehicle of identical type to the host vehicle when moving along the specific travel direction;

wherein the terminal apparatus is characterized in that the plurality of radio communication positions on the host vehicle are spaced apart with respect to a direction at right angles to an advancement direction of the host vehicle, and in comprising a relative position estimation unit configured for:

determining a plurality of respectively different information combinations, each of the information combinations comprising one of the travel locus/condition information sets generated by the host vehicle and one of the reception maps, calculating respective magnitudes of agreement degree of the information combinations, comparing the respective magnitudes of agreement degree with one another, and estimating a position of the host vehicle relative to a reference travel locus, with respect to a direction at right angles to the reference travel locus, based on results of the comparison;

the reference travel locus comprising a travel locus previously traversed along the travel direction by the host vehicle or vehicle of the same type as the host vehicle when obtaining the travel locus/condition information constituting the reception maps.

2. The terminal apparatus as claimed in claim 1, wherein an amount and direction of change in position of the host vehicle in a direction at right angles to the advancement direction is estimated as an amount of change in position of the host vehicle relative to the reference travel locus in a direction at right angles to the reference travel locus.

3. The terminal apparatus as claimed in claim 1, comprising a position variation estimation unit configured for estimating a rate of variation with time of the position of the host vehicle along a direction at right angles to the advancement direction of the host vehicle, based on a rate of variation with time of magnitude relationships between a plurality of the agreement degrees.

4. The terminal apparatus as claimed in claim 1, wherein the plurality of radio communication positions on the host vehicle are disposed in line along a direction at right angles to the advancement direction of the host vehicle.

5. The terminal apparatus as claimed in claim 1, comprising a travel distance compensation unit configured for applying compensation to respective lengths of the reception maps when the host vehicle is travelling around a curved section of the reference travel locus.

6. The terminal apparatus as claimed in claim 5, wherein the radio communication positions comprise a first radio communication position and a second radio communication position, the plurality of travel locus/condition information sets comprise a first travel locus/condition information set and a second travel locus/condition information set respectively corresponding to the first radio communication position and the second radio communication position, and the plurality of reception maps comprise a first reception map and a second reception map respectively corresponding to the first radio communication position and the second radio communication position, and wherein the travel distance compensation unit:

selects a first one of the information combinations as having a greater magnitude of agreement degree when the host vehicle is positioned at an outer side of the curved section of the reference travel locus than when the host vehicle is positioned at the reference travel locus, and applies the compensation by expanding a length of a selected part of a travel locus of the reception map corresponding to the first information combination, the selected part corresponding to the curved section of the reference travel locus; and selects a second one of the information combinations as having a greater magnitude of agreement degree when the host vehicle is positioned at an inner side of the curved section of the reference travel locus than when the host vehicle is positioned at the reference travel locus, and applies the compensation by contracting a length of a selected part of a travel locus of the reception map corresponding to the second information combination, the selected part corresponding to the curved section of the reference travel locus.

7. The terminal apparatus as claimed in claim 6, wherein the travel distance compensation unit is configured to:

acquire a radius of curvature (r) of the curved section of the reference travel locus and a value of separation distance (d) between the first radio communication position and the second radio communication position as measured along a direction at right angles to the advancement direction of the host vehicle;

expand the length of the selected part of the travel locus of the reception map corresponding to the first information combination by multiplying by a factor $(r+d)/r$; and contract the length of the selected part of the travel locus of the reception map corresponding to the second information combination by multiplying by a factor $r/(r+d)$.

8. The terminal apparatus as claimed in claim 1, comprising a directionality adjustment unit controllable for adjusting respective radio signal reception directivities at the plurality of radio communication positions.

* * * * *